United States Patent

Sharp

[15] 3,689,778
[45] Sept. 5, 1972

[54] ELECTRICAL CIRCUIT ARRANGEMENTS FOR CONVERTING A VARIABLE RATE OF PULSE TRANSMISSION INTO A RELATED ELECTRICAL OUTPUT QUANTITY

[72] Inventor: Denis Sharp, East Grinstead, England

[73] Assignee: U. S. Philips Corporation,

[22] Filed: July 27, 1970

[21] Appl. No.: 58,350

[30] Foreign Application Priority Data

July 25, 1969 Great Britain..........37,578/69

[52] U.S. Cl..................307/233, 328/109, 324/78 E
[51] Int. Cl..............................................H03k 5/20
[58] Field of Search.............307/233; 324/78 E, 78 I; 328/109

[56] References Cited

UNITED STATES PATENTS 3,205,448  9/1965  Bahrs et al. ..............324/78 E
3,209,251  9/1965  Edeington et al............324/78

Primary Examiner—James W. Lawrence
Assistant Examiner—Harold A. Dixon
Attorney—Frank R. Trifari

[57] ABSTRACT

A circuit for deriving an output voltage that is proportional to the frequency of a train of input pulses. The input pulses charge a first capacitor and are also applied to an RC timing circuit. Between pulses the charge on the timing capacitor decays approximately as a rectangular hyperbola to produce a corresponding reference voltage. If and when the reference voltage reaches a given voltage level, the first capacitor begins to discharge and follows the reference voltage until it is recharged upon receipt of the next input pulse. An output terminal is coupled to the first capacitor to derive an output voltage proportional to the input pulse frequency.

18 Claims, 16 Drawing Figures

INVENTOR.
DENIS SHARP
BY
AGENT

INVENTOR.
DENIS SHARP

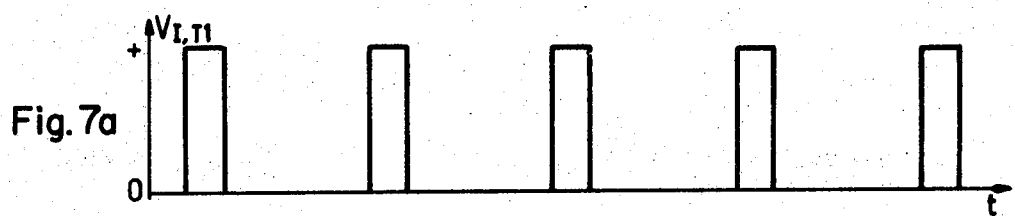
Fig. 7a
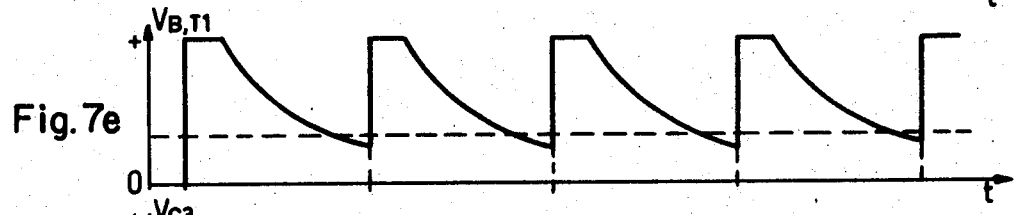
Fig. 7e
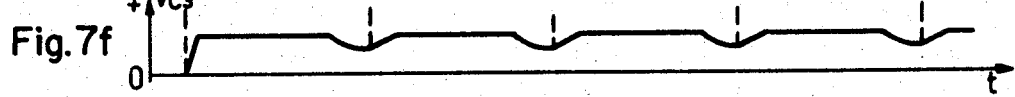
Fig. 7f
Fig. 7b
Fig. 7c
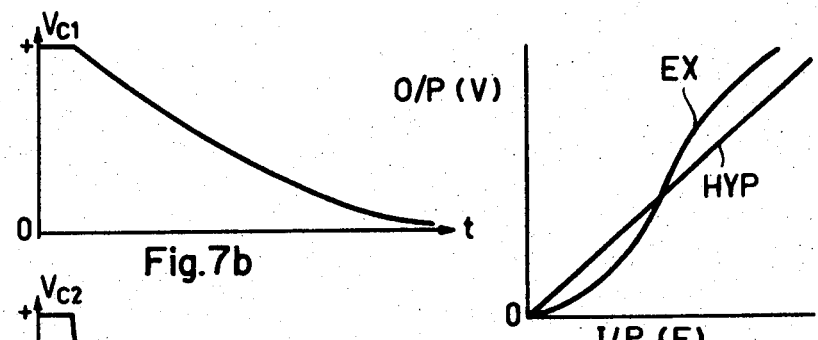
Fig. 7d
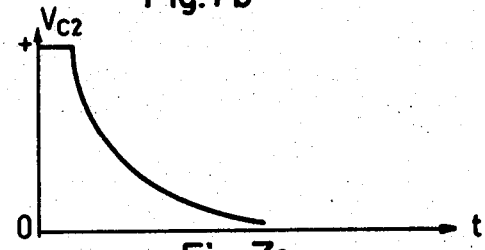
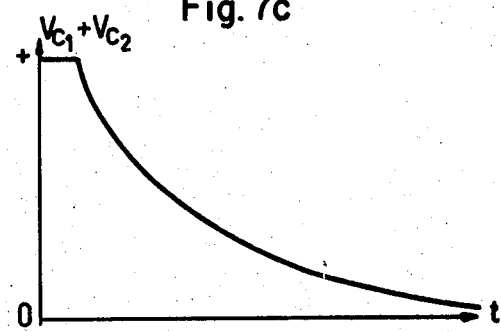
Fig. 7g
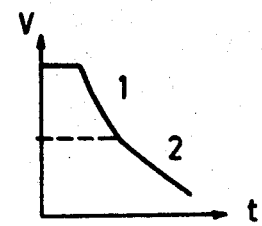
Fig. 7h
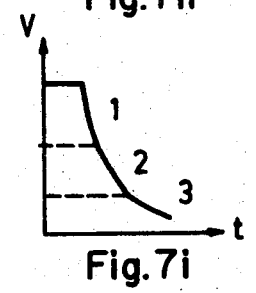
Fig. 7i
INVENTOR.
DENIS SHARP
BY
AGENT

ELECTRICAL CIRCUIT ARRANGEMENTS FOR CONVERTING A VARIABLE RATE OF PULSE TRANSMISSION INTO A RELATED ELECTRICAL OUTPUT QUANTITY

This invention relates to electrical circuit arrangements for converting a variable rate of pulse transmission into a related electrical output quantity.

According to the present invention such an electrical circuit arrangement comprises a storage capacitor arranged to be charged in response to input pulses applied to the arrangement, together with timing capacitance means also arranged to be charged in response to said input pulses, said timing capacitance means being further arranged such that, during the periods between successive input pulses, the charge thereon decays at least approximately as a rectangular hyperbola (rather than exponentially) so that a reference voltage due to said charge decays correspondingly. The arrangement further includes means responsive, when said reference voltage reaches a certain value, for establishing a discharge circuit through which the charge on said storage capacitor can decay during the periods between successive input pulses to cause the value of voltage across the storage capacitor to follow the value of the reference voltage. The output quantity from the arrangement is derived from the storage capacitor in accordance with the level of charge thereon.

In the operation of an electrical circuit arrangement according to the invention, the charge on said storage capacitor and thus the voltage across it is replenished in response to successive input pulses applied to the arrangement. The higher the frequency of the applied pulses the faster the storage capacitor is replenished and thus less of the charge on it decays through said discharge circuit during the periods between successive pulses, and vice-versa. Also, the higher the frequency of the applied pulses the less the reference voltage decays, and vice-versa. Thus, the voltage (output quantity) existing across the storage capacitor is related to the frequency of the applied pulses.

As will be described, the fact that said reference voltage decays as a rectangular hyperbola (or at least approximately so) during the periods between successive input pulses results in a good linear relationship between the frequency of the input pulses and the resulting output quantity (voltage). For frequencies between 100 cps and 1,000 cps, the linear relationship attained is better than would be attained if the reference voltage decayed exponentially due to a normal capacitor discharge action.

In carrying out the invention, the timing capacitance means for effecting the reference voltage decay as a rectangular hyperbola may comprise at least two resistance-capacitance circuit elements which are, in effect, superimposed one on the other such that their respective exponential decay voltages are summated to form said reference voltage. Alternatively, the timing capacitance means may comprise a resistance-capacitance circuit in which the charge on a capacitor is arranged to decay through a first value of resistance until the voltage across the capacitor has decayed to a certain value, following which the charge is then arranged to decay through at least a second value of resistance to alter the rate of decay, the resulting voltage which forms said reference voltage thus decaying at at least two different exponential rates in succession.

An electrical circuit arrangement according to the invention has a particular application in anti-lock brake systems for wheeled vehicles, that is, systems including means for improving braking performance of a vehicle by relieving braking pressure applied to a road wheel of the vehicle if the wheel tends to lock on a slippery surface following brake application and then increasing the braking pressure again without the need for any change in the actual braking action by a person using the brake. Such systems can be successful in reducing the risk of skidding due to wheel lock and in maintaining directional control during braking, and can also reduce braking distances.

This application is in control circuit means of an anti-lock vehicle brake system of the character comprising, for use in conjunction with a vehicle wheel and associated wheel brake, a wheel movement sensor for producing electrical signals related to rotational movement of the wheel, control circuit means which is responsive to said electrical signals to produce an electrical output in dependence on a particular criterion related to wheel rotational movement, and control valve means which is arranged for actuation in response to said electrical output to cause braking pressure as applied from a fluid pressure source of the system to the wheel brake to be relieved. A suitable criterion — though not the only one — is when deceleration of the wheel is in excess of a predetermined value.

In this application, the electrical circuit arrangement is used to provide a voltage of value related to the frequency of a pulse train (constituting said electrical signals) which is generated in response to wheel rotational movement by, for example, magnetic interaction between a electromagnetic toothed ring movable with the wheel and an electromagnetic pick-up which is positioned adjacent to the ring to sense change of flux as each tooth of the ring passes it and is succeeded by a gap when the wheel revolves, said ring and pick-up constituting the wheel movement sensor. The resulting output voltage thus produced, which is related to the frequency of the pulse train, can be utilized in the control circuit means for determining when the electrical output from the latter is to be produced for actuating the control valve means. The use of the electrical circuit arrangement is particularly advantageous in this application because it can maintain an accurate linear relationship between pulse input frequency and related voltage output over a wide range of wheel speed.

The present invention also provides an anti-lock vehicle brake system of the above character having control circuit means embodying an electrical circuit arrangement as set forth above.

In order that the invention may be more fully understood, reference will now be made by way of example to the accompanying drawings in which FIGS. 1 to 3 show respective embodiments of an electrical circuit arrangement conforming to the invention;

FIG. 4 is a block diagram of a control circuit means of an anti-lock vehicle brake system of the character referred to;

FIG. 6 is a block diagram of an anti-lock vehicle brake system of the character referred to;

FIGS. 7a–7i show explanatory waveform diagrams and curves; and

Figure 1:
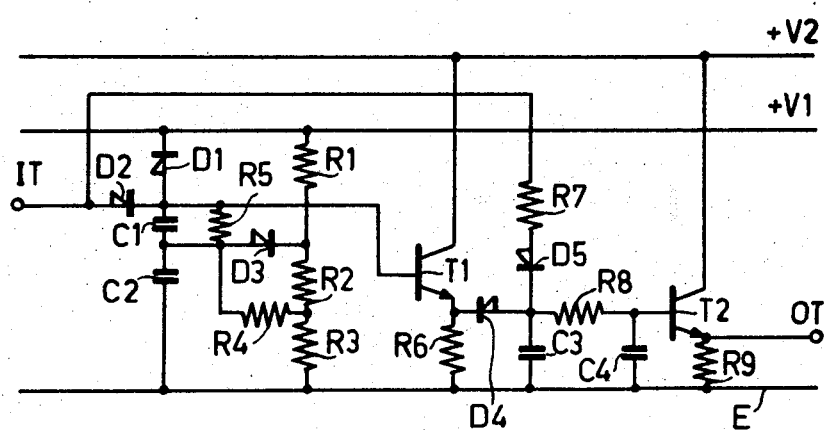

Referring to the drawings, the electrical circuit arrangement shown in FIG. 1 comprises two timing capacitors C1 and C2 connected in series with a diode D1 between a ground line E and a stabilized voltage line +V1. The junction of the capacitor C1 and the diode D1 is connected to an input terminal IT via a diode D2, and this junction is also connected to the base of en emitter follower transistor T1. A potential divider comprising three resistors R1, R2 and R3 extends between the ground line E and the stabilized voltage line +V1. The junction of the two capacitors C1 and C2 is connected to the junction of the resistors R1 and R2 via a diode D3 and to the junction of the resistors R2 and R3 via a resistor R4. A resistor R5 is connected across the capacitor C1. The emitter follower transistor T1 has its collector connected to a supply voltage line +V2 and its emitter connected to the ground line E via a resistor R6. The emitter of the transistor T1 is also connected via a diode D4 to one side of a storage capacitor C3 the other side of which is connected to the ground line E. The junction of the capacitor C3 and diode D4 is connected via a diode D5 and a resistor R7 in series to the input terminal IT. This junction is also connected via a resistor R8 to the base of a second emitter follower transistor T2 which has its collector connected to the supply voltage line +V2 and its emitter connected to the ground line E via a resistor R9. A capacitor C4 is connected between the ground line E and the base of the transistor T2, and an output terminal OT is connected to the emitter of the transistor T2.

Consider now the operation of the electrical circuit arrangement of FIG. 1 in response to a train of square wave pulses applied to the input terminal IT, this train of square wave pulses being represented by the waveform diagram in FIG. 7a. The positive half-cycle of each pulse of the train is applied through the diode D2 to charge up the two capacitors C1 and C2 in series. Capacitor C2 is of much smaller value than capacitor C1 (e.g., 0.047μF for C2 and 0.22μF for C1), so that the voltage across it will build up quickly until it reaches a value at which the diode D3 becomes forward biassed and thereby clamps the voltage across capacitor C2 to the value of the voltage that exists at the junction of resistors R1 and R2. The voltage across capacitor C1 builds up more slowly until it reaches a value at which the diode D1 becomes forward biassed and thereby clamps the voltage across capacitor C1 to that of the stabilized voltage line +V1. Also, the positive half-cycle of each pulse of the train is applied through resistor R7 and diode D5 to charge the storage capacitor C3. During the periods between successive positive half-cycles of the applied pulse train, the charge on capacitor C1 decays through resistor R5 and the charge on the capacitor C2 decays through resistor R4. (Resistor R3 could be dispensed with, in which case the resistor R4 would be connected directly across capacitor C2). The resulting exponential decay of the voltage across capacitors C1 and C2 may be as represented by the curves 7b and 7c respectively, of FIG. 7. The decay of the voltage across capacitor C1 is slow compared with the decay of the voltage across capacitor C2 because C1R5 afford a larger time constant than C2R4. However, the voltage across capacitor C1 is, in effect, summated with the voltage across capacitor C2 due to the series connection of the two capacitors, and the resultant summated voltage approximates to a rectangular hyperbola and is represented by the curve 7d of FIG. 7. It is this resultant summated voltage which is applied to the base of the transistor T1 so that the voltage waveform at this base, due to the applied pulse train, is as represented by the waveform diagram 7e of FIG. 7. The voltage at the emitter of the transistor T1 follows the voltage at the base of the latter. Each time this emitter voltage falls below the voltage across the storage capacitor C3, diode D4 becomes forward biassed so that the capacitor C3 commences to discharge through this diode and resistor R6. The frequency of the applied pulses determines the duration of the period between successive pulses and thus the extent to which the capacitor C3 can discharge. The waveform diagram 7f of FIG. 7 represents the voltage across the capacitor C3. This voltage is applied via the resistor R8 to the base of the transistor T2 which, due to its emitter follower action, produces a corresponding output voltage at the output terminal OT. The capacitor C4 is optionally provided to suppress the negative-going voltage spikes at the base of transistor T2.

The electrical circuit arrangement of FIG. 1 can provide a good linear relationship between the magnitude of the output voltage at the output terminal OT and the frequency of the pulse train applied to the input terminal IT, the linear relationship being maintained up to an input frequency of around 1,000 cps. In contrast, an arrangement which relies on the exponential decay of a capacitor, rather than a decay as a rectangular hyperbola, as in the present invention, to provide a decaying reference voltage for controlling the decaying of the charge on the storage capacitor during the periods between successive applied pulses, may not give a good linear relationship between input frequency and output voltage magnitude over as wide a frequency range. This contrast is illustrated by the curves shown in FIG. 7g.

Figure 2:
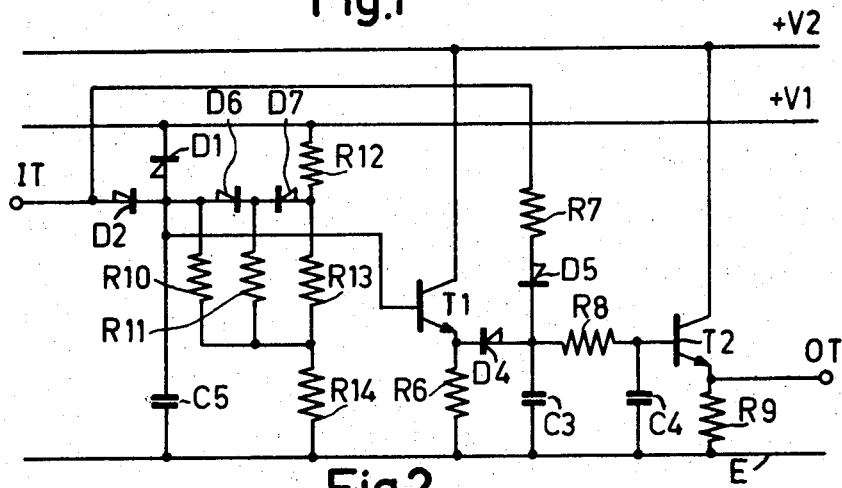

Turning now to FIG. 2, the electrical circuit arrangement there shown is similar in many respects to the arrangement of FIG. 1, and for the sake of convenience corresponding components in FIGS. 1 and 2 have been given the same references. The arrangement of FIG. 2 is essentially different in that is has only a single timing capacitance C5 which is arranged to be charged by the positive half-cycle of each pulse applied to it via diode D2 from the input terminal IT. The diode D1 functions, as before, to limit the voltage across the capacitor C5 to the voltage of the stabilized voltage line +V1. During the periods between successive pulses, the capacitor C5 is allowed to discharge. Initially, there are two discharge paths for this purpose, one via a resistor R10 and the other via a diode D6 and a resistor R11. However, the junction of the resistor R11 and diode D6 is connected via a diode D7 to the junction of two resistors R12 and R13, which together with a resistor R14 form a potential divider between the stabilized voltage line +V1 and the ground line E. Thus, when the voltage across the capacitor C5 has decayed below the value of the voltage present at the junction of resistors R12 and R13, the diode D6 becomes reverse biassed so that further decay of the charge on the capacitor C5 occurs now via resistor R10 only. In other words, the decay of the charge on the capacitor C5 is at two different exponential rates which together result in a decay curve which approximates to a rectangular hyperbola, such curve being represented by the curve in FIG. 7h. The voltage across capacitor C5 is applied to the base of transistor T1, and the operation of the arrangement of FIG. 2 is thereafter as already described for the arrangement of FIG. 1.

Figure 3:
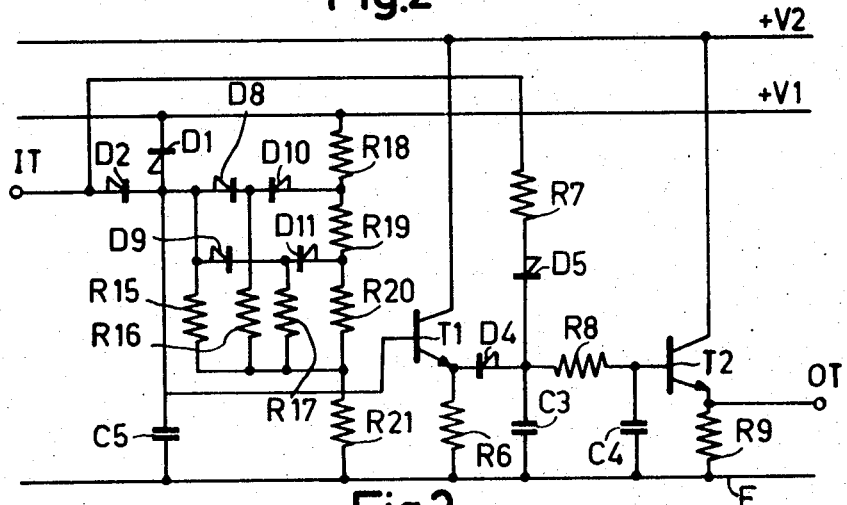

The electrical circuit arrangement shown in FIG. 3 is an elaboration has three discharge paths, the first via a resistor R15, the second via a diode D8 and a resistor R16 and the third via a diode D9 and a resistor R17. A potential divider comprising resistors R18 to R21 provides two reference voltages, one at the junction of resistors R18 and R19 and the other at the junction of resistor R19 and R20. Thus, when the voltage across the capacitor C5 has decayed sufficiently, a diode D10 becomes forward biassed to reverse bias diode D8 so that the exponential decay of the voltage across capacitor C5 changes from a first rate to a second rate. Similarly, when the voltage across capacitor C5 has further decayed sufficiently at the second rate a diode D11 becomes forward biassed to reverse bias diode D9 so that the exponential decay of the voltage across capacitor C5 changes from said second rate to a third rate. In this instance, therefore, the decay cruve approximates more nearly to a rectangular hyperbola, as indicated by the curve in FIG. 7i. The circuit arrangement of FIG. 3 is otherwise the same as the arrangement of FIG. 2.

Figure 8:
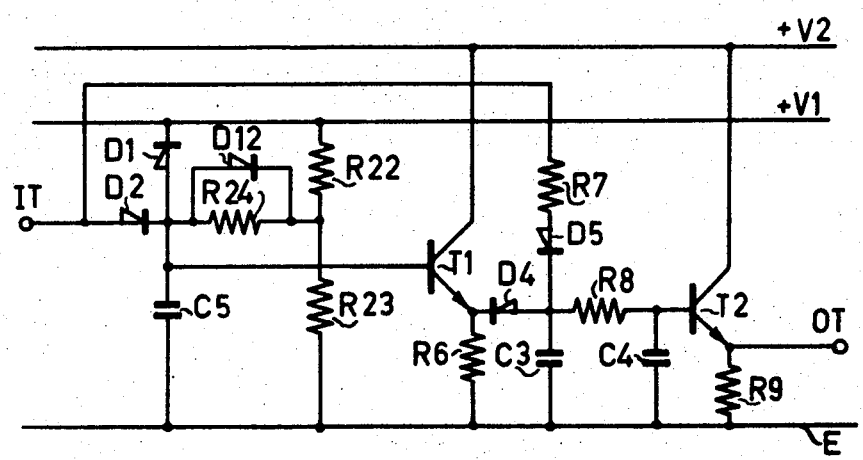
FIG. 8 shows a further embodiment of an electrical circuit arrangement conforming to the invention.

The electrical circuit arrangement shown in FIG. 8 is similar to those shown in FIGS. 2 and 3 in that it also has only a single timing capacitance C5 which is arranged to be charged by the positive half-cycle of each pulse applied to it via diode D2 from the input terminal IT, and that it includes a diode D1 for limiting the voltage across the capacitor C5 to the voltage of the stabilized voltage line +V1, but it differs in the manner in which the two discharge paths for the capacitor C5 are provided. In FIG. 8, these two discharge paths are provided by components D12 and resistors R22, R23 and R24. Resistors R22 and R23 form a potential divider across the stabilized voltage line +V1, and resistor R24 and diode D12 are connected in parallel between the junction of the resistors R22 and R23 and the junction of capacitor C5 and diode D1. During the periods between successive input pulses, the capacitor C5 initially discharges only through the resistance of the potential divider formed by resistors R22 and R23 because the voltage across capacitor C5 is sufficient to cause diode D12 to become conductive and provide a shunt path across resistor R24. However, when the voltage across the capacitor C5 has decayed below the value of the voltage needed to keep diode D12 conducting, then further decay of the charge on the capacitor C5 occurs now via resistor R24 in series with the resistance of the potential divider formed by resistors R22 and R23. In other words, as in FIG. 2, the decay of the charge on the capacitor C5 occurs at two different exponential rates which together result in a decay curve which approximates to a rectangular hyperbola.

As aforesaid, an electrical circuit arrangement according to the invention has application in control circuit means of an anti-lock vehicle brake system of the character referred to, and an example of this application will now be considered.

Figure 4:
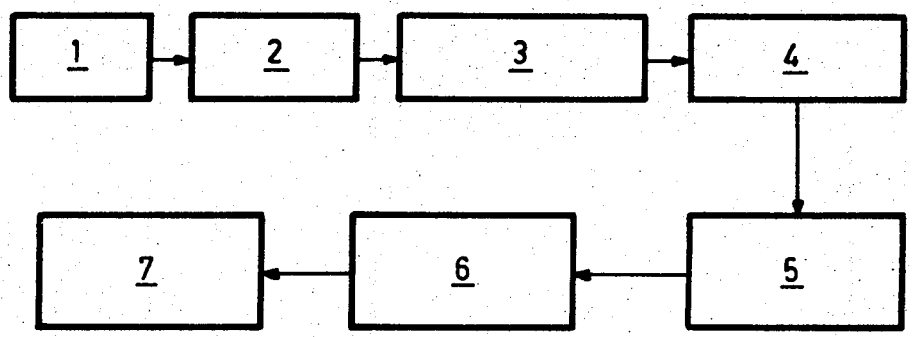

Turning now to FIG. 4, the control circuit means represented by the block diagram there shown is responsive to pulses related to rotational movement of a vehicle wheel. These pulses may be produced by an electromagnetic pick-up 1 which, as aforesaid, is associated with a ferromagnetic toothed ring movable with the wheel to sense change of flux as each tooth of the ring passes it and is succeeded by a gap as the wheel revolves. The pulse output from the pick-up 1 is amplified and limited by an amplifier 2, and the resulting square wave output is applied to a frequency-to-DC convertor 3 which can be an electrical circuit arrangement conforming to the present invention and which is responsive to the square wave output to produce an output voltage of a magnitude related to the frequency of the pulses supplied by the pick-up 1. This output voltage is applied to a signal processing circuit 4 which is responsive to produce an output in dependence on a particular criterion related to wheel rotational movement as signified by the output voltage from the convertor 3. The output from the circuit 4 is amplified by a power amplifier 5, and the output from the power amplifier 5 is utilized to operate a solenoid 6 which is adapted to actuate control valve means 7 of an antilock vehicle brake system.

Figure 5:
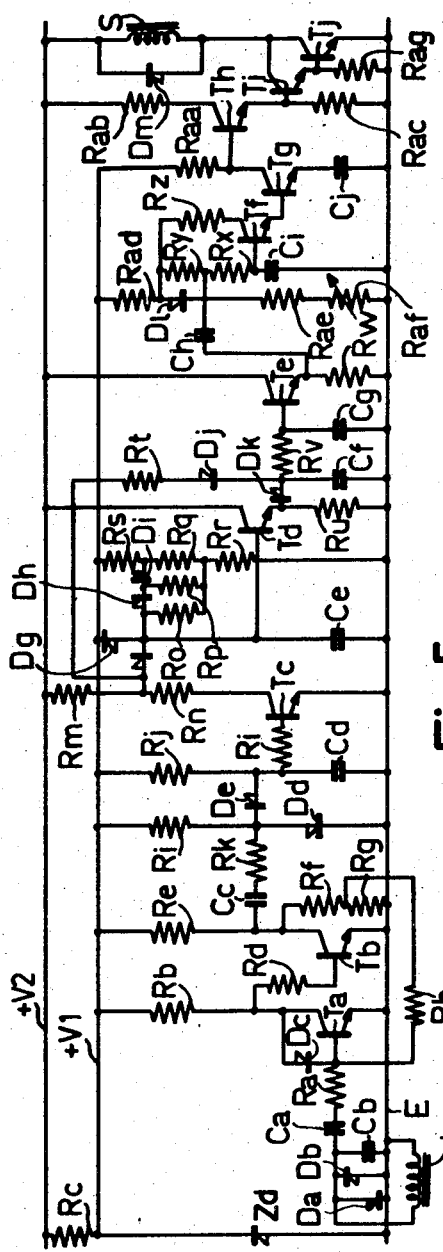
FIG. 5 is a circuit diagram of the control circuit means of FIG. 4 and including the electrical circuit arrangement of FIG. 2.

The circuit diagram of the control circuit means is shown in FIG. 5 and comprises a transistor Ta having its base connected via a resistor Ra and a capacitor Ca to one end of an output coil L of a pick-up device (not otherwise shown) which is arranged to produce an alternating input signal for application to the base of transistor Ta. The other end of the coil L is connected to a ground line E. The collector of the transistor Ta is connected to a stabilized positive voltage line +V1 via a collector resistor Rb, and its emitter is connected directly to the ground line E. A capacitor Cb serves to remove unwanted interference in the alternating input signal from the coil L, and diodes Da and Db limit the amplitude swing of the alternating input signal. The stabilized voltage +V1 is provided by a Zener diode Zd which is connected in series with a resistor Rc between the ground line E and a supply voltage line +V2. There is connected between the collector and base of transistor Ta a diode Dc which is poled so as to conduct current from the collector to the base. A resistor (not shown) may also be included in series with the diode Dc. When the circuit is energized by the application of a suitable supply voltage across the supply voltage line +V2 and the ground line E, the transistor Ta is initially biassed at the threshold of conduction by a bias voltage which is present at its base, this bias voltage being the voltage drop across the diode Dc due to current flow therethrough from collector to base. Upon the application of an alternating input signal from the coil L to the base of transistor Ta, this transistor is rendered conductive in response to each cycle of the input to effect amplification and limiting at the pulse train frequency, and the resulting output at the collector of transistor Ta is a square wave voltage. More specifically, with the transistor Ta at the threshold of conduction, this transistor is saturated each time the rate of change of signal current through capacitor Ca drives sufficient current into the transistor base. Conversely, the transistor Ta, when saturated, is turned off each time the rate of change of signal current through capacitor Ca drives insufficient current into he transistor base to maintain the saturated condition. This circuit operation is made possible, irrespective of large variations in the amplitude of the alternating input signal, because the bias voltage at the base of transistor Ta remains substantially unchanged due to the action of the diode Dc which provides a voltage drop between the collector and the base of the transistor Ta. As aforesaid, this voltage drop, which may be of the same value as the baseemitter voltage of the transistor Ta, provides the bias voltage at the transistor base. Each negative half-cycle of the alternating input signal draws increased current, in relation to its amplitude, through the diode Dc and, but for the latter, this increased current would produce at the base of transistor Ta a change in the bias voltage in a sense taking the transistor hard into cut-off to an extent determined by the magnitude of the change. The diode Dc prevents this from happening by functioning as a constant voltage device to maintain the bias voltage substantially unchanged at the base of the transistor Ta.

The square wave output produced at the collector of transistor Ta is fed via a resistor Rd into the base of a further transistor Tb which has its emitter connected to the ground line E and its collector connected via a resistor Re to the stabilized voltage line +V1. Two resistors Rf and Rg are connected in series between the collector of transistor Tb and the ground line E, and a connection including a resistor Rh is taken from the junction of the resistors Rf and Rg to the base of the transistor Ta. With transistor Ta non-conductive, the transistor Tb is saturated, so that the junction of the resistors Rf and Rg is effectively at the potential of the earth line E. Thus the base of the transistor Ta can be considered as being connected to the ground line E through the resistor Rh. The ratio of the values of the resistors Ra and Rh determines the minimum magnitude of an alternating input signal which must be present before the transistor T a is rendered conductive. This ratio may be, for example, 1:10. When the transistor Ta is saturated, the transistor Tb is non-conductive, so that the junction of the resistors Rf and Rg is at a potential above that of the ground line E, being a proportion of the collector potential of transistor Tb in dependence on the relative values of the resistors Rf and Rg. Thus the base of the transistor Ta is now effectively connected to this potential which is arranged to be as much greater than the bias voltage as the bias voltage is greater than the potential of the ground line E. Consequently, due to the ratio of the values of the resistors Ra and Rh, an input signal of certain magnitude and opposite sense to previously must be present before the transistor Ta is cut off. A square wave output is produced at the collector of transistor Tb, but only when the alternating input signal is greater than a minimum value. This prevents the from producing a spurious square wave output in response to low amplitude noise signals received with an applied input. The circuit element formed by transistors Ta and Tb and their associated components is also described in co-pending U.S. patent application Ser. No. 58,348 and forms the amplifier 2 of FIG. 4.

The square wave output at the collector of transistor Tb is applied to an input circuit element for the frequency-to-DC convertor circuit in accordance with the invention. This input circuit has the function of producing an output of constant pulse width in response to the square wave output at the collector of transistor Tb, and comprises a first time constant element formed by a capacitor Cc and a resistor Ri, and a second time constant element formed by a capacitor Cd and a resistor Rj. A resistor Rk is connected in series between the capacitor Cc and the resistor Ri but the value of this resistor Rk is very small compared with the value of the resistor Ri so that its effect on the first time constant element is negligible. The junction of the two resistors Ri and Rk is connected to the ground line E via a diode Dd, and also to the junction of the resistor Rj and capacitor Cd via a diode D e. This latter junction is also connected via a resistor Rl to the base of a transistor Tc, which has its emitter connected directly to the ground line E and its collector connected via resistors Rm and Rn to supply voltage line +V2.

When the transistor Tb is saturated, the rate of change of current in a negative sense at the collector of transistor Tb i.e., the leading edge of the resulting square wave output pulse) is reflected through capacitor Cc, which is therefore effectively discharged, so that the potential at the junction of resistors Ri and Rk undergoes a rapid change in a negative sense. This causes diode De to become forward biassed so that the potential at the base of transistor Tc also undergoes a rapid change in a negative sense due to the discharge of capacitor Cd through diode De. As a result, transistor Tc is cut off. Thereafter, the capacitor Cc commences to charge-up through resistor Ri so that the potential at the junction of resistors Ri and Rk is restored as a sawtooth function towards it original value. Also, the capacitor Cd commences to charge-up through resistor Rj so that the potential at the base of transistor Tc is restored as a sawtooth towards its original value. When this latter potential reaches its original value the transistor Tc is rendered conductive again.

If the time constant value of capacitor Cc and resistor Ri is less than the cyclic time of the alternating input signal, then the potential at the junction of resistors Ri and Rk will restore to its original value as a sawtooth and remain at that value until the next leading edge of the square wave output pulse produced at the collector of transistor Tb. However, if this time constant value is greater then the cyclic time, then on the occurrence of the trailing edge of the subsisting square wave output pulse, the rate of change of current in a positive sense at the collector of transistor Tb is reflected through capacitor Cc which is therefore effectively charged-up via diode Dd, so that the potential at the junction of resistors Ri and Rk is restored by this trailing edge to its original value. However, the restoration as a sawtooth of the potential at the base of transistor Tc remains unaffected by the sudden change in potential at the junction of resistors Ri and Rk because diode De remains back biased. Therefore, the period for which Tc remains non-conductive, and thus the duration of each output pulse at its collector, remains constant. Of course, the output pulse frequency varies with a variation in the frequency of the alternating input signal, but the duration of the output pulses is unaffected by variations in the mark-space ratio of the alternating input signal.

It will be appreciated that if the cyclic time of the alternating input signal becomes equal to or shorter than the time constant value of capacitor $Cd$ and resistor $Rj$, then the output pulses will, in effect, overlap so that a continuous output voltage is produced. This input circuit element is also described in co-pending U.S. patent application Ser. No. 58,347.

The output voltage at the junction of resistors $Rm$ and $Rn$ is applied to an electrical arrangement, conforming to the invention, which together with the input circuit element forms the frequency-to-DC convertor circuit 3 of FIG. 4. This electrical circuit arrangement comprises diodes $Df$, $Dg$, $Dh$, $Di$, $Dj$, $Dk$, resistors $Ro$, $Rp$, $Rq$, $Rr$, $Rs$, $rt$, $Ru$, $Rv$, $Rw$, capacitors $Ce$, $Cf$, $Cg$, and transistors $Td$, $Te$, and functions as previously described with reference to FIG. 2 to produce at the emitter of transistor $Te$ an output voltage which is related to the frequency of the alternating input signal from the pick-up coil L. This output voltage, which may thus be termed a speed signal as it is directly related to wheel speed, is coupled to the base of a normally conductive transistor $Tf$ via a capacitor $Ch$ and a resistor $Rx$. The value of this capacitor $Ch$ and the value of a resistor $Ry$, to which this capacitor is also coupled, determine a selected wheel deceleration at which transistor $Tf$ and a further normally conductive transistor $Tg$ are rendered non-conductive in response to the value of speed signal then obtaining, to cause a normally non-conductive transistor $Th$ to become conductive. The components $Ch$, $Ci$, $Tf$, $Tg$, $Rx$, $Ry$, $Rz$ and $Dl$ essentially comprise the signal processing circuit 4 of FIG. 4. The resistor $Ry$, which together with resistor $Rx$ forms a potential divider in the base circuit of transistor $Tf$, provides a current sufficient to drive the base of transistor $Tf$ with about 10 times the current needed to maintain the two transistors $Tf$ and $Tg$ normally conductive. Thus the selected wheel deceleration at which transistor $Th$ becomes conductive is virtually independent of the gains of the transistors $Tf$ and $Tg$. The resistor $Rz$ in the collector circuit of transistor $Tf$ serves to limit the base current of transistor $Tg$, and the capacitor $Ci$ and the resistor $Rx$ in the base circuit of transistor $Tf$ makes the circuit insensitive to ripple in the speed signal. The diode $De$ serves to stabilize the base current of the transistor $Tf$ against temperature changes. A capacitor $Cj$ serves to prevent spurious oscillation at high frequencies due to the transistors being capable of working up to 80 M/cs.

A transistor $Ti$ and a further transistor $Tj$ amplify the output from transistor $Th$. These transistors $Th$, $Ti$ and $Tj$ form the power amplifier 5 of FIG. 4. The output from transistor $Tj$ drives a solenoid S which corresponds to the solenoid 6 in FIG. 4. A diode $Dm$ serves to clip overshoot voltage on the solenoid S when it is switched off, thereby preventing too high a voltage from being applied to the collector of transistor $Tj$.

The circuit parameters can be so chosen that the solenoid would be turned off when the wheel being sensed has accelerated up to the speed it would have been doing if it had continued to decelerate from its initial speed, at the instant of braking, at a rate equal to the selected wheel deceleration at which the solenoid was turned on.

It is also arranged that the solenoid S is turned off after a predetermined period, even if the wheel does not re-accelerate after the solenoid S has been turned on. This is achieved by means of capacitor $Ch$ which in conjunction with resistor $Ry$ serves as an a.c. coupling to differentiate the speed signal so that, after a certain period of energization of the solenoid, as determined by the time constant of this a.c. coupling, the transistors $Tf$ and $Tg$ are rendered conductive again to render transistor $Tj$ non-conductive to de-energize the solenoid. However, since the capacitor $Ch$ and resistor $Rg$ also determine the selected wheel deceleration, the time constant of the a.c. coupling afforded by these components cannot be varied to vary the period before the solenoid is de-energized in the absence of wheel re-acceleration without also varying the selected wheel deceleration. A separate a.c. coupling which is independent of capacitor $Ch$ and resistor $Ry$ suitably comprises a further capacitor connected in the base circuit of transistor $Th$ together with a further resistor connected between this base and the ground line E.

The circuit diagram of FIG. 5 may be modified in that if a capacitor $Ch$ of larger value and higher gain transistors are used, the transistor $Tf$ and its collector resistor $Rz$ can be dispensed with and the junction of resistor $Rx$ and capacitor $Ci$ can then be connected directly to the base of transistor $Tg$.

In each of the circuits of FIGS. 1 to 3, and FIG. 5, transistors of opposite type to those shown may be used with suitable adjustment of the voltage supply lines.

Also, in each of FIGS. 1 to 3, and FIG. 5, the transistor $Tl$ (or $Td$) and diode D4 (or $Dk$) may be replaced by an n-p-n transistor having its emitter connected only to resistor R8 (or $Rv$) and its collector connected through a load resistor to the ground line E. As another modification, resistor R7 (or $Rt$) can be connected to the line +V1 or +V2 instead of to the pulse input. In this case, the diode D5 (or $Dj$) would be omitted.

Suitable components and component values for the circuit diagram of FIG. 5 are as given in the following table for a wheel diameter of 2 feet having 60 teeth/revolution on a toothed ring attached thereto, for which a typical output voltage from the magnetic pick-up would be 1 volt peak at 100 cps (7mph) and 10 volts peak at 1,000 cps. (approx. 70mph).

If the electrical circuit arrangement of FIG. 8 is used in the circuit of the control circuit means of FIG. 5, instead of the arrangement of FIG. 2, then components D12, R22, R23 and R24 of FIG. 8 would suitably be as follows:

D12 — OA202 (Mullard)
R22 — 150 KΩ, R23 — 82 KΩ, R24 — 100 KΩ.

Resistors

| | | |
|---|---|---|
| $Ra$ — 22K ohms | $Rl$ — 1K ohms | $Rv$ — 47K ohms |
| $Rb$ — 47K ohms | $Rm$ — 1K ohms | $Rw$ — 10K ohms |
| $Rc$ — 150 ohms | $Rn$ — 100Ω ohms | $Rx$ — 33K ohms |
| $Rd$ — 10K ohms | $Ro$ — 15K ohms | $Ry$ — 470K ohms |
| $Re$ — 4.7K ohms | $Rp$ — 15K ohms | $Rz$ — 470K ohms |
| $Rf$ — 68K ohms | $Rq$ — 1K ohms | $Raa$ — 33K ohms |
| $Rg$ — 12K ohms | $Rr$ — 1K ohms | $Rab$ — 220Ω ohms |
| $Rh$ — 220K ohms | $Rs$ — 1K ohms | $Rac$ — 10K ohms |
| $Ri$ — 100K ohms | $Rt$ — 22K ohms | $Rad$ — 10K ohms |
| $Rj$ — 82K ohms | or (1M) | $Rae$ — 10K ohms |
| $Rk$ — 1K ohms | $Ru$ — 3.3K ohms | $Raf$ — 10K ohms |

Rag — 1K ohms

| Capacitors | Transistors | |
| --- | --- | --- |
| Ca — .22μF | Ta — BC108 | (Mullard) |
| Cb — .1μF | Tb " | " |
| Cc — .022μF | Tc " | " |
| | or pnp | |
| Cd — .047μF | Td (BCY71) | " |
| Ce — .22μF | Te " | " |
| Cf — 1.0μF | Tf " | " |
| Cg — .1μF | Tg " | " |
| Ch — 2.2μF | Th — " | |
| Ci — .1μF | Ti — BFY52 | |
| Cj — 4.7KpF | Tj — BDY10 | |

| Diodes | | Voltages |
| --- | --- | --- |
| Zd — 8.2v zener (Mullard) | | +V1 — 8.2v stabilize |
| Da — OA202 | " | +V2 — 12v. |
| Db — " | " | |
| Dc — " | " | |
| Dd — " | " | |
| De — " | " | |
| Df — " | " | |
| Dg — " | | |
| Dh — " | (Mullard) | |
| Di — " | " | |
| Dj " | " | |
| Dk " | " | |
| Dl " | " | |
| Dm — BYZ10 | " | |

Figure 6:
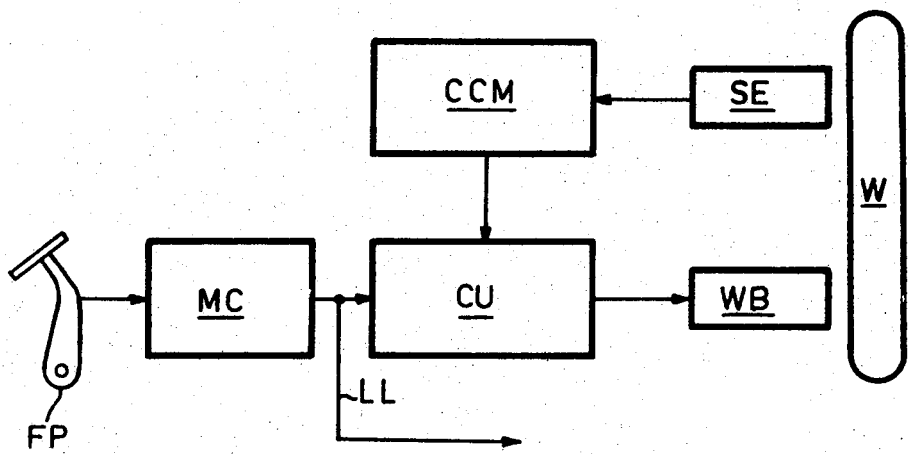

FIG. 6 shows diagrammatically a general layout for an anti-lock vehicle brake system in which the present invention can be embodied. This layout shows a brake foot pedal FP for actuating the piston of a master cylinder MC which constitutes a fluid pressure source of the system. The master cylinder is arranged to actuate (directly or via a servo) a wheel brake WB for a vehicle wheel W via an anti-lock control unit CU. A wheel movement sensor SE applies electrical pulses related to wheel rotational movement to a control circuit means CCM. The anti-lock control unit CU would include control valve means which is arranged for actuation in response to an electrical output from the control circuit means CCM to relieve braking pressure applied to the wheel brake WB. This system is of the character previously referred to, and in the present instance in which the control circuit means is in accordance with FIGS. 4 and 5, the electrical output would be produced from the control circuit means CCM when the deceleration of the wheel is in excess of a predetermined value. The wheel movement sensor SE would be pick-up 1, and the solenoid 6 and the control valve means 7 would be included in the anti-lock control unit CU.

As indicated by the lead LL, separate systems as shown in FIG. 6 (with a common fluid pressure source) may be provided in respect of each road wheel of a vehicle, but it would also be possible to provide a single system for two (rear) wheels driven by a vehicle propellor shaft with a sensor associated with the shaft for producing the electrical signals related to wheel rotational movement. As an alternative, a single anti-lock control unit including control valve means may be provided in common for all the road wheels of a vehicle. In this case each road wheel would have its own wheel movement sensor and associated control circuit means, and any of the latter would provide an electrical output to actuate the control valve means when the appertaining wheel tends towards a locked condition.

As alternatives to the particular form of signal processing circuit shown in FIG. 5, any of the signal processing circuits describing in co-pending U.S. application Ser. No. 884,551 can be used. A control circuit means as thus embodied can be for an anti-lock vehicle brake system as described in co-pending U.S. application Ser. No. 215,622.

What we claim is:

1. An electrical circuit arrangement comprising a storage capacitor arranged to be charged in response to input pulses applied to the arrangement, timing capacitance means also arranged to be charged in response to said input pulses, said timing capacitance means being further arranged such that, during the periods between successive input pulses, the charge thereon decays at least approximately as a rectangular hyperbola to produce a corresponding reference voltage due to said charge decay, the arrangement further including means responsive, when said reference voltage reaches a certain value, for establishing a discharge circuit through which the charge on said storage capacitor decays during the periods between successive input pulses to cause the value of voltage across the storage capacitor to follow the value of the reference voltage, and means for deriving an output quantity from the storage capacitor in accordance with the level of charge thereon.

2. An electrical circuit arrangement as claimed in claim 1, wherein said timing capacitance means comprise at least two resistance-capacitance circuit elements which are, in effect, superimposed one on the other such that their respective exponential decay voltages are added to form said reference voltage.

3. An electrical circuit arrangement as claimed in claim 1, wherein said timing capacitance means comprises a resistance-capacitance circuit in which the charge on a capacitor thereof is arranged to decay through a first value of resistance until the voltage across the capacitor has decayed to a certain valve following which the charge is then arranged to decay through at least a second value of resistance to alter the rate of decay, the resulting voltage which forms said reference voltage thus decays in accordance with at least two different exponential rates in succession.

4. An electrical circuit arrangement as claimed in claim 1 wherein said timing capacitance means comprises a capacitor and first and second resistance paths with different values of resistance, the arrangement including a potential divider having at least one tap point to which the side of the capacitor at which said input pulses are applied is connected via two series-connected diodes, of which the one nearer the capacitor is poled to conduct current away from the capacitor and the other is oppositely poled, means connecting said first resistance path directly across the capacitor and said second resistance path between the junction of said two diodes and the other side of the capacitor, the diode nearer the capacitor being forward biassed when the voltage across the capacitor is greater than the voltage at said tap point whereby the charge on said capacitor decays through both of said resistance paths until the voltage across the capacitor becomes less than the voltage at said tap point whereupon the diode nearer the capacitor is reverse biassed so that the charge on said capacitor then decays only through said first resistance path.

5. An electrical circuit arrangement as claimed in claim 1 wherein said timing capacitance means comprises, a capacitor, a potential divider having a tap point which is connected to the side of the capacitor at which said input pulses are applied via the parallel connection of a resistance and a diode which is poled to conduct current away from the capacitor, means connecting one end of the potential divider to the other side of the capacitor so that when the voltage across the capacitor is sufficient to cause the diode to become conductive, the charge on said capacitor will decay at a rate governed essentially by the resistance of the potential divider until the voltage across the capacitor becomes insufficient to keep the diode conducting whereupon the charge on said capacitor will decay at a rate governed by the combined value of the resistance of the potential divider and the resistance in parallel with said diode.

6. An electrical circuit arrangement as claimed in claim 1 wherein said means for establishing said discharge current for the storage capacitor comprises an emitter follower transistor having its base connected to receive said reference voltage and its emitter connected to the storage capacitor via a diode polarized to be forward biassed when the voltage across the storage capacitor becomes greater than the voltage at said emitter to allow the storage capacitor to discharge through the emitter resistor of the emitter follower transistor, whereby the voltage across the storage capacitor follows the emitter voltage and thus the reference voltage.

7. An electric circuit arrangement as claimed in claim 1 wherein said timing capacitance means comprises at least two resistance-capacitance circuit elements including respective capacitors which are connected in series for charging in response to said input pulses, one of said capacitors being of smaller value than the other and being connected via a first diode to a first source of clamping voltage to which the voltage across this smaller value capacitor is clamped when said first diode becomes forward biassed due to the charge on said one capacitor, and means connecting the other of said two capacitors via a second diode to a second higher source of clamping voltage to which the voltage across said other capacitor is clamped when said second diode becomes forward biassed due to the charge on said other capacitor, the arrangement further including respective shunt resistive paths across the two capacitors through which the capacitors discharge, respectively, during the periods between successive input pulses, the voltage across said two capacitors in series constituting said reference voltage.

8. A circuit for deriving an output voltage that is proportional to the frequency of an input pulse train comprising, an input terminal adapted to receive the pulse train, a first capacitor, means for charging said capacitor to a given voltage level in response to each input pulse applied to said input terminal, timing capacitor means connected to the input terminal so as to be charged up in response to each input pulse applied thereto, circuit means coupled to said timing capacitor means for discharging same approximately as a rectangular hyperbola during the period between successive input pulses to derive a corresponding reference voltage, means controlled by the reference voltage for discharging the first capacitor during said period between input pulses when the reference voltage reaches a predetermined voltage level and in a manner such that the voltage across the first capacitor follows the reference voltage, and an output terminal coupled to said first capacitor to derive said proportional output voltage.

9. A circuit as claimed in claim 8 wherein said timing capacitor means comprises a second capacitor connected to said input terminal and said circuit means comprises, a voltage divider connected across a source of voltage, and first and second diodes connected in series with opposed polarities between the second capacitor and a tap point on the voltage divider, the diode closest to the second capacitor being polarized to conduct current when the second capacitor voltage exceeds the voltage at the tap point.

10. A circuit as claimed in claim 9 wherein said circuit means further comprises a resistor connected between the second capacitor and a second tap point on the voltage divider and said first capacitor charging means comprises means for connecting the first capacitor to said input terminal to be charged up by the input pulses.

11. A circuit as claimed in claim 8 wherein said timing capacitor means comprises second and third capacitors with different values of capacitance and serially connected to said input terminal, and said circuit means comprises a first resistive discharge path connected in shunt with the second capacitor and a second resistive discharge path connected in shunt with the third capacitor.

12. A circuit as claimed in claim 11 further comprising first and second clamping diodes connected between said second and third capacitors and first and second points of clamping voltage, respectively, and wherein said first capacitor charging means comprises means for connecting the first capacitor to said input terminal to be charged up by the input pulses.

13. A circuit as claimed in claim 8 wherein said timing capacitor means comprises a second capacitor connected to said input terminal and said circuit means comprises, a voltage divider connected across a source of voltage, first diode gate means connected between the second capacitor and a tap point on the voltage divider and polarized to conduct current when the capacitor voltage exceeds the voltage at the tap point.

14. A circuit as claimed in claim 13 wherein said circuit means further comprises first and second resistance discharge paths coupled across said second capacitor and one of which includes said diode gate means.

15. A circuit as claimed in claim 14 wherein the other resistance discharge path includes a resistor connected between the second capacitor and a second tap point on the voltage divider.

16. A circuit as claimed in claim 13 wherein a portion of said voltage divider is included in at least one of said resistance paths and the other resistance path includes a resistor connected in parallel with said diode gate means.

17. A circuit as claimed in claim 16 wherein said first capacitor charging means comprises means for connecting the first capacitor to said input terminal to be charged up by the input pulses.

18. A circuit as claimed in claim 13 wherein said circuit means further includes a resistor across which the reference voltage is developed and said first capacitor discharging means includes a diode connected between the first capacitor and the resistor and polarized to conduct current from the first capacitor to the resistor.

* * * * *